US011212383B2

(12) United States Patent
Voss et al.

(10) Patent No.: US 11,212,383 B2
(45) Date of Patent: Dec. 28, 2021

(54) CUSTOMIZING TEXT MESSAGES IN MODIFIABLE VIDEOS OF MULTIMEDIA MESSAGING APPLICATION

(71) Applicant: Snap Inc., Santa Monica, CA (US)

(72) Inventors: Jeremy Voss, Los Angeles, CA (US);
Victor Shaburov, Ocean Village (GI);
Ivan Babanin, Saratov (RU);
Aleksandr Mashrabov, Sochi (RU);
Roman Golobokov, Sochi (RU)

(73) Assignee: Snap Inc., Santa Monica, CA (US)

( * ) Notice: Subject to any disclaimer, the term of this patent is extended or adjusted under 35 U.S.C. 154(b) by 55 days.

(21) Appl. No.: 16/878,868

(22) Filed: May 20, 2020

(65) Prior Publication Data

US 2021/0368039 A1 Nov. 25, 2021

(51) Int. Cl.

| H04B 1/38 | (2015.01) |
|---|---|
| H04M 1/72439 | (2021.01) |
| H04L 12/58 | (2006.01) |
| G06T 11/60 | (2006.01) |
| G06T 13/80 | (2011.01) |
| H04M 1/72427 | (2021.01) |
| H04M 1/72436 | (2021.01) |
| H04M 1/72442 | (2021.01) |

(52) U.S. Cl.
CPC ......... *H04M 1/72439* (2021.01); *G06T 11/60* (2013.01); *G06T 13/80* (2013.01); *H04L 51/02* (2013.01); *H04L 51/16* (2013.01); *H04M 1/72427* (2021.01); *H04M 1/72436* (2021.01); *H04M 1/72442* (2021.01)

(58) Field of Classification Search
CPC ......... H04M 1/72439; H04M 1/72436; H04M 1/72442; H04M 1/72427; G06T 11/60; G06T 13/80; G06T 51/02; H04L 51/16
USPC ........................................ 455/566, 466, 418
See application file for complete search history.

(56) References Cited

U.S. PATENT DOCUMENTS

| 10,943,371 | B1* | 3/2021 | Voss | ........................ G06T 11/00 |
| 2014/0085334 | A1* | 3/2014 | Payne | ............... H04M 3/42382 |
| | | | | 345/633 |
| 2014/0375691 | A1* | 12/2014 | Kasahara | ................ G06T 11/60 |
| | | | | 345/633 |
| 2015/0334067 | A1 | 11/2015 | Zonka | |

(Continued)

FOREIGN PATENT DOCUMENTS

CN 110968204 A 4/2020

*Primary Examiner* — Danh C Le
(74) *Attorney, Agent, or Firm* — Georgiy L. Khayet

(57) ABSTRACT

A system for customizing text messages in modifiable videos of a multimedia messaging application (MMA) is provided. In one example embodiment, the system includes a processor and a memory storing processor-executable codes, wherein the processor is configured to analyze recent messages of a user in the MMA to determine a context of the recent messages; determine, based on the context, a customized text message; select, based on the context, a list of relevant modifiable videos from a database configured to store modifiable videos, the modifiable videos being associated with preset text messages; replace the preset text messages in the relevant modifiable videos with the customized message; and render the list of relevant modifiable videos for viewing and selecting by the user, the rendering including displaying the customized text message in the relevant modifiable videos.

20 Claims, 7 Drawing Sheets

(56) References Cited

U.S. PATENT DOCUMENTS

| | | |
|---|---|---|
| 2016/0080296 A1 | 3/2016 | Lewis et al. |
| 2017/0193280 A1 | 7/2017 | Huang et al. |
| 2017/0286366 A1 | 10/2017 | Chang et al. |
| 2018/0241961 A1* | 8/2018 | Choi .................... H04N 7/0122 |
| 2018/0268595 A1 | 9/2018 | Sama et al. |
| 2018/0309801 A1* | 10/2018 | Rathod ................. H04L 67/141 |
| 2019/0197755 A1* | 6/2019 | Vats ...................... G06T 13/205 |
| 2020/0090210 A1* | 3/2020 | Weldemariam .... G06Q 30/0244 |
| 2020/0150794 A1* | 5/2020 | Han ....................... G06F 3/0488 |
| 2020/0213680 A1* | 7/2020 | Ingel .................... H04N 21/233 |
| 2020/0234483 A1* | 7/2020 | Mashrabov ........ H04M 1/72403 |
| 2020/0335132 A1* | 10/2020 | Fahy ..................... G11B 27/031 |
| 2021/0158586 A1* | 5/2021 | Castellucci ............. G06T 11/60 |
| 2021/0224319 A1* | 7/2021 | Ingel ..................... G10L 15/005 |

* cited by examiner

CUSTOMIZING TEXT MESSAGES IN MODIFIABLE VIDEOS OF MULTIMEDIA MESSAGING APPLICATION

TECHNICAL FIELD

This disclosure generally relates to multimedia messaging applications (MMAs) and, more particularly, to customizing text messages in modifiable videos of the MMAs.

BACKGROUND

Sharing media, such as stickers and emojis, has become a standard option in the MMAs. Currently, some of the messengers provide users with an option for generating and sending images and short videos to other users via a communication chat. These short videos can be pre-generated and stored in a database and provided to the MMAs on demand.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
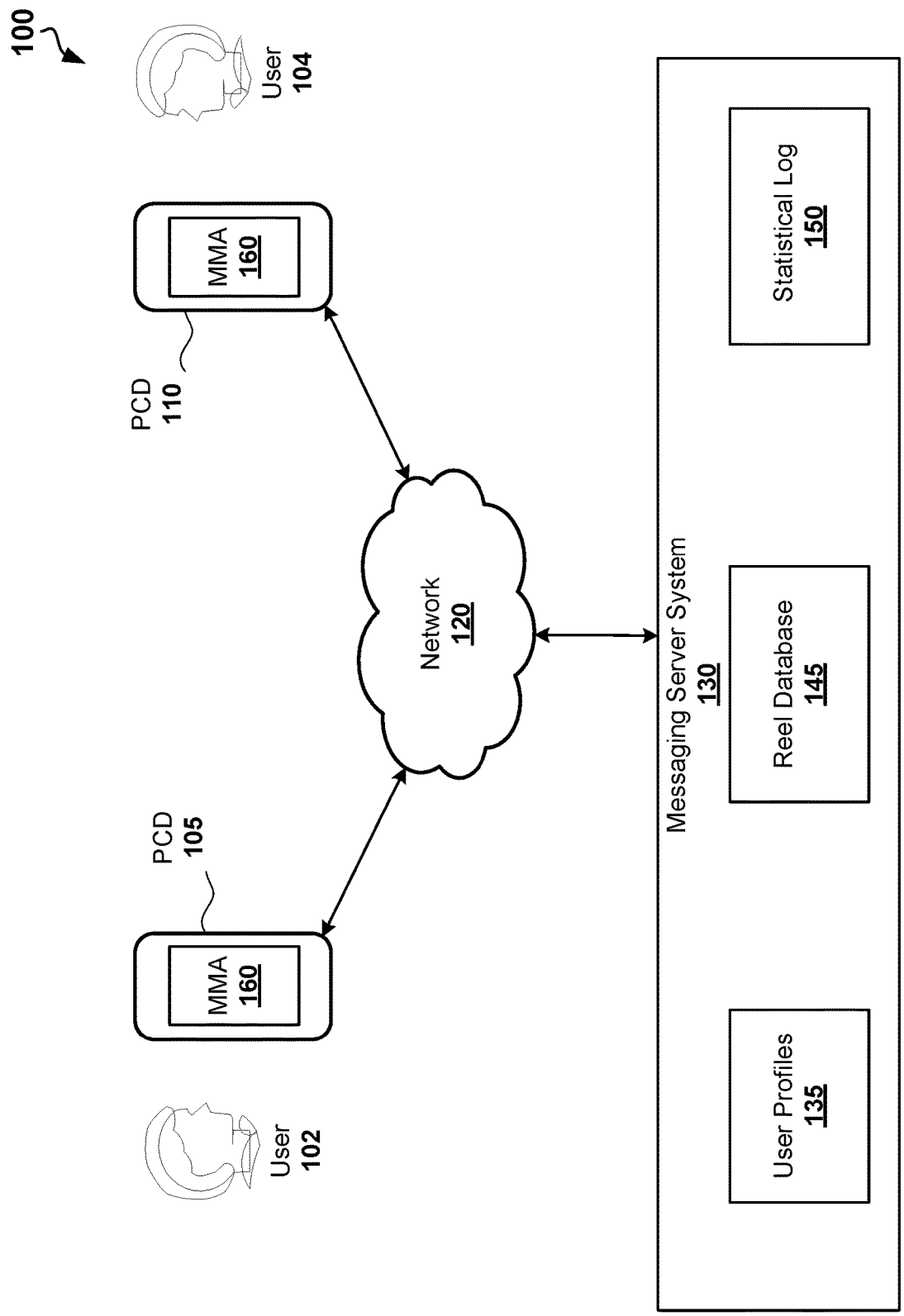
FIG. 1 is a block diagram showing an example environment wherein a system and a method for customizing text messages in modifiable videos of the MMAs can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The disclosure provided herein is directed to customizing text messages in reels used in an MMA. A reel, also referred to herein as a modifiable video, can be defined as a short movie or a video clip. The MMA is an application that can be executed on a personal computing device (PCD), such as a smartphone, a tablet, a laptop, and so forth. The MMA can enable communication chats, in which users of the PCDs can exchange messages and reels.

The reels can be generated by the developer of the MMA and stored in a database. The database can reside in a computing cloud. While using the MMA, a user can view reels under various categories such as, for example, "Recent," "Featured," "Greetings," "Love," "Happy," "Upset," "Celebration," and so forth. The "Recent" category can be personalized for the user and include reels recently shared by the user with other users, most shared reels, popular reels, new reels that the user has not viewed yet, or any combinations of thereof. In one embodiment, the number of reels in the "Recent" category may be limited to a pre-determined number. If the number of the recently shared reels is less than the pre-determined number, the remaining positions of the "Recent" category can be filled with reels from the "Featured" category.

The MMA may also include a user option for typing in a text message. Upon receiving the text message, the MMA may search for reels relevant to the text message in the database. MMA may then provide the user for review a list of the reels relevant to the text message.

In some example embodiments, the user may select a reel from the categories or the search results and send the selected reel via the communication chat. The selected reel may include frames and some of the frames may include an area designated for a facial image. The facial image can also be referred to as a selfie. The MMA may allow the user to generate the selfie using a camera application of the PCD or a photograph provided by the user. The selfie can be inserted into the area in the frame. The frame may include a set of facial parameters representing a facial expression. Upon being inserted into the frame, the selfie can adopt a facial expression. When the reel is played back, the selfie in the frames may perform facial movements according to changes in facial expressions across the frames of the reel.

The selected reel may include a pre-generated text message. Prior to sending the selected reel via the communication chat, the user can modify the text message and the style of animation of the text message.

In some embodiments, the MMA can analyze recent messages of the user in the communication chat to determine context of the recent messages and emotional state of the user. The context and the emotional state can be determined with one of machine learning techniques (for example, a specially trained artificial neural network). The MMA may also generate a customized text message based on the context and the emotional state of the user.

Upon determining that the user has entered an option for typing in a text message, the MMA may provide a list of reels that are relevant to the context and the emotional state. The MMA may also prefill a field for entering the text message with one or more keywords corresponding to the context and the emotional state. In some embodiments, the MMA may prefill the field for entering the text message with a customized text message.

When the user selects the reels from the lists of relevant reels, the MMA may provide an option for modifying the customized message and the style of the customized message in the selected reel. The MMA may modify the customized message based on the context of the communication chat and the emotional state. The MMA may also modify the style of the customized message based on the context of the communication chat and the emotional state of the user. For example, if the emotional state of the user is "upset," letters of the customized message may be depicted as frozen ice. In another example, if the user is "angry," the letters of the customized message may be depicted as burning flames.

The MMA may collect statistical data. The statistical data may include records "context→customized text message→suggested list of reels→a selected reel or indication that no reels is selected by user." The statistical data can be used to adjust an algorithm for searching the relevant reels based on the context and theme of the communication chat and the emotional state of the user.

FIG. 1 shows an example environment 100, wherein a system and a method for customizing text messages in modifiable videos in MMAs can be practiced. The environment 100 may include a PCD 105, a user 102, a PCD 110, a user 104, a network 120, and messaging server system (MSS) 130. The PCD 105 and PCD 110 can refer to a mobile device such as a mobile phone, smartphone, or tablet computer. In further embodiments, however, the PCD 105 and PCD 110 can refer to a personal computer, laptop computer, netbook, set top box, television device, multimedia device, personal digital assistant, game console, entertainment system, infotainment system, vehicle computer, or any other computing device.

The PCD 105 and the PCD 110 can be communicatively connected to the MSS 130 via the network 120. The MSS 130 can be implemented as a cloud-based computing resource(s). The MSS 130 can include computing resource(s) (hardware and software) available at a remote location and accessible over a network (e.g., the Internet). The cloud-based computing resource(s) can be shared by multiple users and dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network), and so forth.

In some embodiments of the disclosure, the PCD 105 and PCD 110 may include MMA 160 configured to enable a communication chat between the user 102 and the user 104. The user 102 and the user 104 may exchange text message and videos during the communication chat. The videos may include personalized videos. The personalized videos can be generated based on reels stored in the PCD 105 or the PCD 110. In some embodiments, the reels can be stored in the MSS 130 and downloaded to the PCD 105 or the PCD 110 via MMA 160 on demand.

The MSS 130 may include a reel database 145 for storing the reels. The reels can be generated based on animation videos or live action videos. The reels can be downloaded to the PCD 105 or the PCD 110. The MSS 130 may include a statistical log 150 for storing statistics of downloads of the reels to determine popularity metrics for the video templates. The popularity metrics can be divided into categories based on an age of user, gender of user, geographical region, and so forth. The statistical log 150 may also store statistics of sharing the reels by users of PCD 105 and PCD 110 via MMA 160.

The MSS 130 may be also configured to store user profiles 135. The user profiles 135 may include images of the face of the user 102, images of the face of the user 104, and images of faces of other persons. The images of the faces can be downloaded to the PCD 105 or the PCD 110 on demand and based on permissions. Additionally, the images of the face of the user 102 can be generated using the PCD 105 and stored in a local memory of the PCD 105. The images of the faces can be generated based on other images stored in the PCD 105. The images of the faces can be further used by the PCD 105 to generate personalized videos based on the reels. Similarly, the PCD 110 may be used to generate images of the face of the user 104. The images of the face of the user 104 can be used to generate, from the reels, personalized videos on the PCD 110.

In further embodiments, the images of the face of user 102 and images of the face of the user 104 can both be used to generate personalized videos on the PCD 105 or the PCD 110.

In some embodiments, a reel may include a preset default text message. The reel may further include preset text parameters for animation of the preset default text message in a personalized video generated based on the reel. The PCD 105 and PCD 110 can be configured to play back the personalized video featuring the preset text message animated based on the preset text parameters. During the playback of the personalized video, the MMA 160 may provide an option to change the preset default text message and parameters for displaying the text message in the personalized video. The PCD 105 may dynamically change the preset default text message in the personalized video while the personalized video is played back. The user 105 may then send the personalized video with the changed text message to the user 104 of the PCD 110 via MMA 160.

Figure 2:
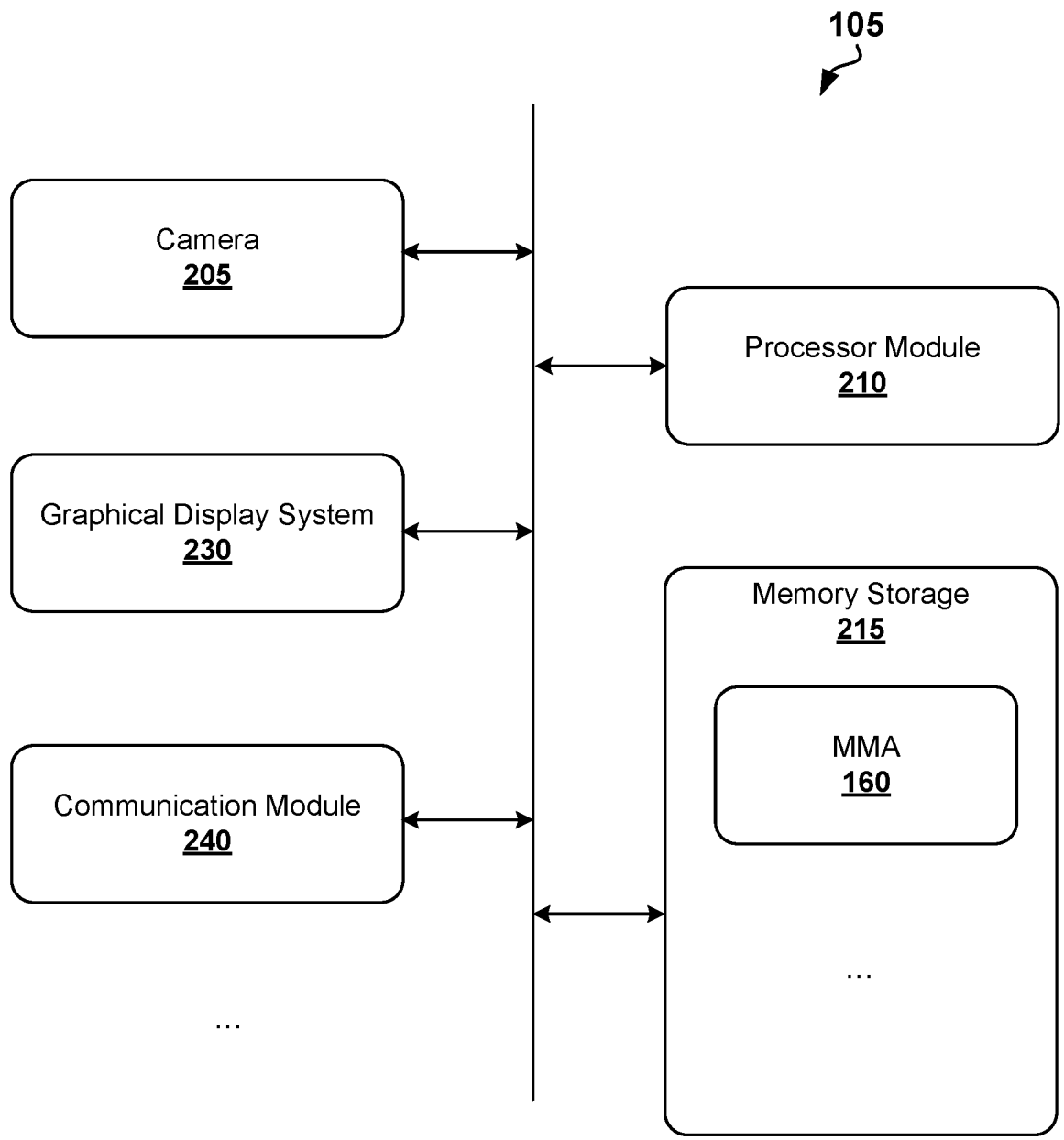
FIG. 2 is a block diagram showing an example embodiment of a computing device for implementing a method for text messages in modifiable videos of the MMAs.

FIG. 2 is a block diagram showing an example embodiment of a PCD 105 (or PCD 110) for implementing methods for customizing text messages in modifiable videos in MMAs. In the example shown in FIG. 2, the PCD 105 includes both hardware components and software components. Particularly, the PCD 105 includes a camera 205 or any other image-capturing device or scanner to acquire digital images. The PCD 105 can further include a processor module 210 and a memory storage 215 for storing software components and processor-readable (machine-readable) instructions or codes, which, when performed by the processor module 210, cause the PCD 105 to perform at least some steps of methods for customizing text messages in modifiable videos as described herein. The PCD 105 may include graphical display system 230 and a communication module 240. In other embodiments, the PCD 105 may include additional or different components. Moreover, the PCD 105 can include fewer components that perform functions similar or equivalent to those depicted in FIG. 2.

The PCD 105 can further include an MMA 160. The MMA 160 may be implemented as software components and processor-readable (machine-readable) instructions or codes stored in the memory storage 215, which when performed by the processor module 210, cause the PCD 105 to perform at least some steps of methods for providing communication chats, generation of personalized videos, and customizing text messages in modifiable videos in MMAs as described herein. A user interface of the MMA 160 can be provided via the graphical display system 230. The communication chats can be enabled by MMA 160 via the communication module 240 and the network 120. The communication module 240 may include a GSM module, a WiFi module, a Bluetooth™ module and so forth.

Figure 3:
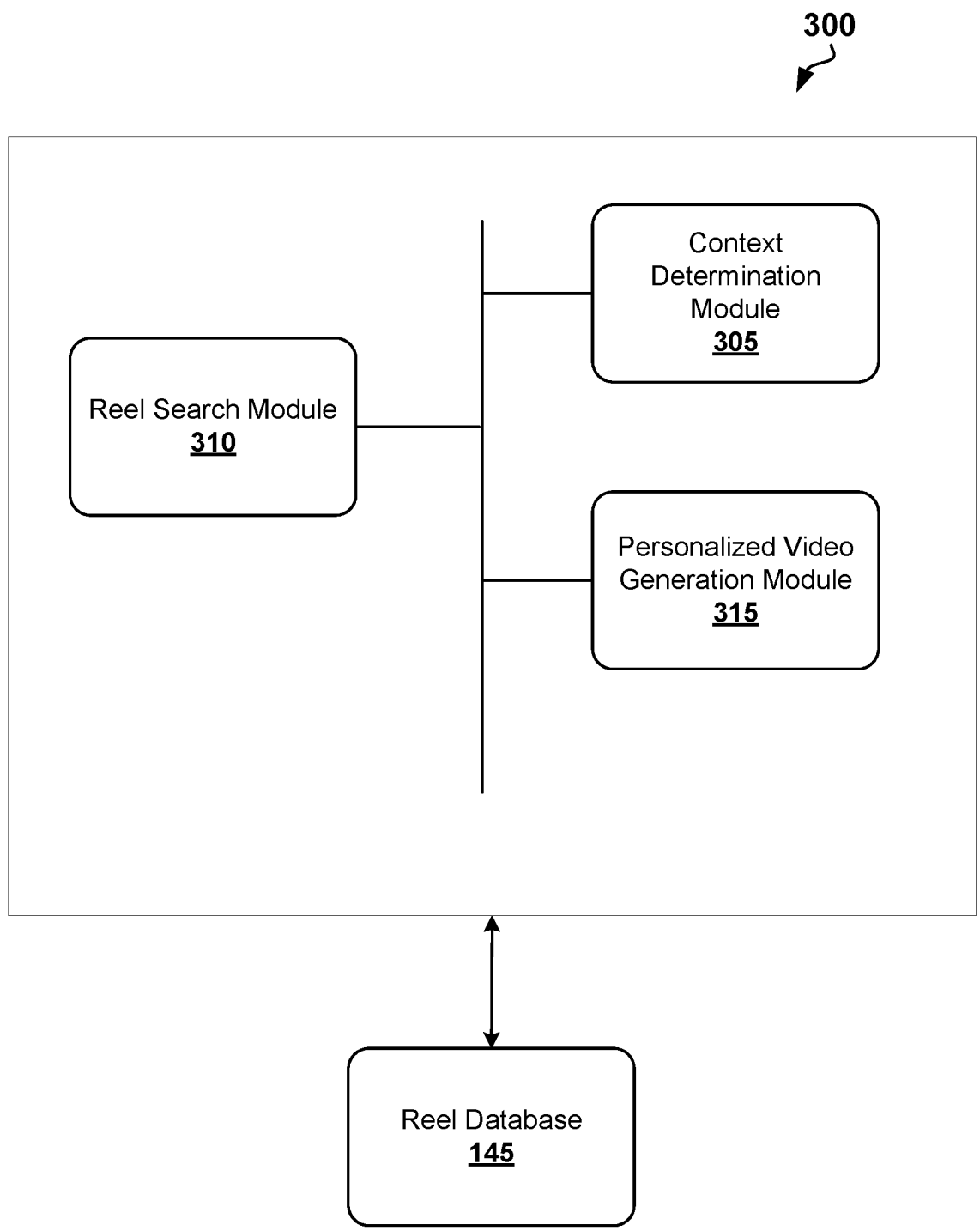
FIG. 3 is a block diagram showing a system for customizing text messages in modifiable videos of the MMAs, according to some example embodiments of the disclosure.

FIG. 3 is a block diagram of system 300 for customizing text messages in modifiable videos in MMAs, according to some example embodiments of the disclosure. The system 300 may include a context determination module 305, a reel search module 310, and a personalized video generation module 315. The system 300 can be integrated in MMA 160.

The context determination module 305 can analyze recent messages of a user in MMA 160 to determine a context of the recent messages and an emotional state of the user. The context determination module 305 can determine a customized text message relevant to the recent messages and the emotional state of the user.

The reel search module 310 may perform a search for relevant reels in the reel database 145 based on the context of the recent messages, a text message, or search query typed in by a user. The reels can be pre-generated recorded videos featuring an actor or multiple actors. The reels may include two-dimensional (2D) videos or three-dimensional (3D) scenes. The reels can be pre-processed to segment the actor's face (also referred to as a target face) and background in each frame and to identify a set of parameters that can be used for further insertion of a source face instead of the face of the actor (the target face). The set of parameters can include a face texture, facial expression parameters, face color, facial identity parameters, position, and angle of the face, and so forth. The set of parameters may also include a list of manipulations and operations that can be carried out on the actor's face, such as the replacement of the actor's face performed in a photo-realistic manner. Each of the reels may include a default soundtrack, a default text message, a default style of text animation, and a default hairstyle.

The reel search module 310 may display, via a user interface of the MMA 160, a search string, and a list of the relevant reels. The search string may include keywords associated with the context. In some embodiments, the search string may include the customized text message determined based on the context. The relevant reels can be selected from the reel database 145 based on the customized text message. For example, the list of the relevant reels may include reels having default text messages semantically close to the customized text message. Distances between the default text messages and the customized text message can be determined based on one or more semantic similarity measures. Prior to displaying the list of relevant reels, the default text messages in the relevant reels can be replaced by the customized text message.

The reel search module 310 may provide the user with an option to modify the customized text message in the search string. Upon determining that the user has changed the customized text message in the search string, the reel search module 310 may perform another search in reel database 145 to update the list of relevant reels displayed to the user.

Each time when the user modifies the customized text message determined based on the context of the recent messages, the reel search module 310 may store, into the statistical log 150, information concerning the context, the customized text message, and the modified customized text message. The information from the statistical log 150 can be used to update an algorithm for determining the context and the customized text message. In some embodiments, the customized text message can be determined using a machine learning model based on historical data in the statistical log 150. The machine learning model can be based on an artificial neural network, decision trees, support vector machine, regression analysis, and so forth.

In some embodiments, prior to displaying the list of relevant reels, the default style of text animation in the relevant reels can be replaced by a customized style text animation. The customized style of text animation can be selected, based on the context of the recent messages and the emotional state of the user, form a library of styles of text animations. For example, if the emotional state of the user is "upset," letters of the customized message can be depicted as frozen ice. In another example, if the user is "angry," the letters of the customized message can be depicted as burning flames.

In some embodiments, prior to displaying the list of relevant reels, the default hairstyle can be replaced by a customized hairstyle. The customized hairstyle can be selected from a library of hairstyles based on the context of the recent messages and the emotional state of the user. For example, if the emotional state of the user is "angry," the user can be depicted in the reel with raised hair and painted with red color. The customized hairstyle can be obtained by changing the texture and color of the hair in a user selfie. The change may include curling hair or straightening hair. The changes may also include shortening the hair if the hair is too long, lengthening the hair if the hair is too short, or increasing volume of the hair. The change can also include painting the hair in color different than the color of the hair in selfie.

In some embodiments, prior to displaying the list of relevant reels, the MMA may add a customized soundtrack to the reels. The customized soundtrack can be selected from a library of soundtracks based on the context of the recent messages and emotional state of the user.

Upon determining that the user has selected a reel from the list of relevant reels, the MMA 160 may provide the user with an option to share the selected reel via a communication chat. The MMA 160 may store information concerning the context, the customized text message, the list of relevant reels, and the selected reels into the statistical log 150.

Prior to sharing the selected reel, the MMA 160 may provide the user with an option to modify the customized text message, the customized style of text animation, the customized hairstyle, and the customized soundtrack. The user may select another style of text animation from the library of styles of text animation. The user may select another soundtrack from the library of soundtracks. The user may select another hairstyle from the library of hairstyles.

Upon determination that user has modified the customized style of text animation prior to sharing the reel, the MMA 160 may store information concerning the context, the emotional state, the customized style of text animation, and the modified style of text animation into the statistical log 150. The information from the statistical log 150 can be used for adjustment of an algorithm for determining an emotional state of a user and an algorithm for selecting the customized style of text animation from the library of styles of text animation.

Upon determination that user has modified the customized hairstyle prior to sharing the reel, the MMA 160 may store information concerning the context, the emotional state, the customized hairstyle, and the modified hairstyle to the statistical log 150. The information from the statistical log 150 can be used for adjustment of an algorithm for determining an emotional state of a user and an algorithm for selecting the customized hairstyle from a library of hairstyles.

Upon determination that a user changed the customized soundtrack prior to sharing the reel, the MMA 160 may store information concerning the context, the customized message, the customized soundtrack, and the modified soundtrack into the statistical log 150. The information from the statistical log 150 can be used for adjustment of an algorithm for selecting a customized soundtrack from the library.

The personalized video generation module 315 can generate a personalized video from the reel based on an image of the source face. The module 315 may replace the face of the actor in a reel with the selfie of the user while keeping the facial expression of the face of the actor. The module 315 may replace a face texture, face color, and facial identity of the actor with a face texture, face color, and facial identity of the selfie. The personalized video generation module 315 can be used by the reel search module 310 to generate relevant reels to be displayed to the user.

Figure 4:
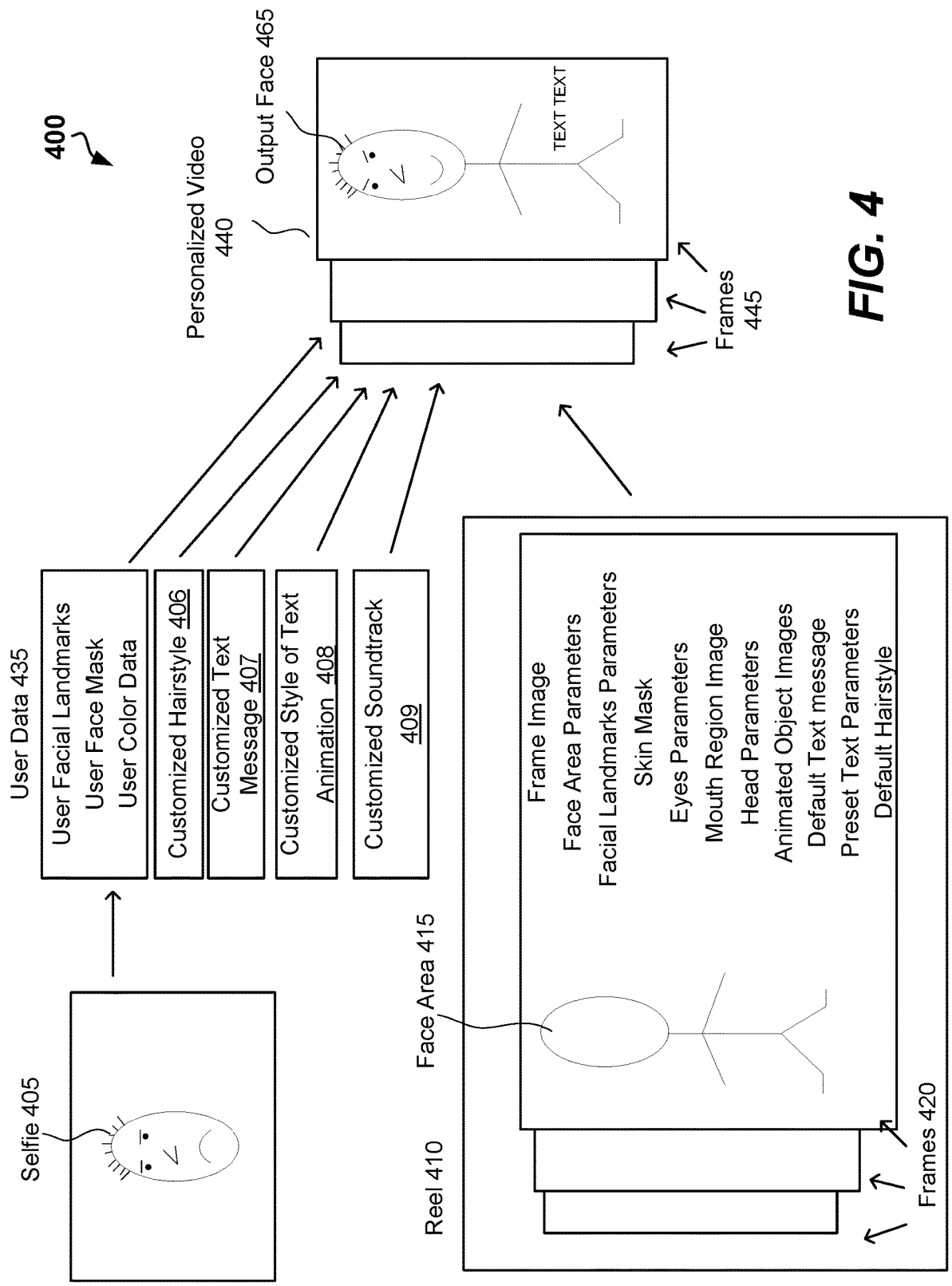
FIG. 4 is a schematic showing a process of generating a personalized video with a customized text message, according to an example embodiment.

FIG. 4 is a schematic showing a process 400 of generating a personalized video with a customized text message by the personalized video generation module 315, according to some example embodiments. The module 315 may receive a user face image (selfie) 405, a reel 410, a customized hairstyle 406, a customized text 407, a customized style of text animation 408, and a customized soundtrack 409. The reel 410 may include a sequence of frames 420. The reel 410 may further include, for each of the frames 420, face area parameters, facial landmark parameters, skin mask, eyes parameters, mouth region image, head parameters, animated object images, preset default text, preset text parameters, and a default hairstyle.

The selfie 405 can be captured by the PCD 105 or selected from a camera roll of the PCD 105. The sequence of the frames 420 can be generated based on a live action video or an animated video. The face area parameters may include coordinates of a position of a face area 415 (an area designated for a facial image) within the frame images. The facial landmark parameters can be generated based on a live action video featuring a face of a facesync actor. The facial landmark parameters may include coordinates of facial landmarks on the face of the facesync actor, such as points around an oval of the face, points around lips and nose, and points around eyebrows and eyelids. Eyes parameters may include coordinates of a position of an iris in sclera of the facesync actor. A mouth region image may include an image of a mouth region of the face of the facesync actor. The skin mask may be generated based on a live video featuring a body of an actor or a skin area of 2D/3D animation of a body. The skin mask may define a skin area of the body of the actor. In an example embodiment, the skin mask and the facial landmark parameters can be generated based on two different live action videos capturing different actors (referred to herein as an actor and a facesync actor, respectively). It should be noted that multiple actors are not required and, in some embodiments, only one actor can be used.

Preset text parameters may define a style of animation of a text in the reel. The preset text parameters may describe visual effects applied to the text. The visual effects may include one or more of the following: a letter animation of an appearance, displaying the text along a path, displaying copies of the text, compression of the text, slicing of the text, a directional appearance of the text, a randomized letter appearance, a distortion and scaling of the text, gradient fill of the text, adding a shadow and a glow to the text, adding directional glow to the text, a flash appearance of the text, adding a perspective shadow to the text, applying a dynamic glow to the text, displaying a distorted shadow or an outline of the text, outlining the text, applying colored font assets to the text, and so forth.

The module 315 may determine, based on the user face image 405, user data 435. The user data may include user facial landmark, user face mask, and user color data. The module 315 may generate, based on the user data 435 and the frames 420, frames 445 of a personalized video 440. The personalized video 440 may be generated in the form of an audiovisual media (e.g., a video, an animation, or any other type of media) that features a face of a user or faces of multiple users.

The generation of the personalized video 440 may include modifying frame images of the frames 420. The modification of the frame images may include modifying the selfie 405 to obtain an output face 465 and inserting the output face in the face area 415 of the frames 420. The output face 465 is the selfie 405 adopting a facial expression corresponding to the facial landmark parameters. The selfie 405 may be modified based on facial landmark parameters corresponding to the frame image. The module 315 may further add the customized soundtrack 409 to the personalized video 440. A hair image of the selfie 405 can be modified in accordance with the customized hairstyle 406.

The module 315 may modify preset text parameters in frames 420 with text parameters corresponding to the customized style of text animation 408. The text parameters define rendering the customized text 407 in the frame images. The text parameters may include a scale of the customized text, a position of the customized text 407 in frames 445 of the personalized video 440, a rotation of the customized text 407, a color of the customized text 407, a number of lines of the customized text 407, a maximum length of the customized text 407, and so forth. The module 315 may render the customized text 407 stylized based on the text parameters. When the personalized video 440 is played back on a screen of the PCD 105, the customized text 407 will appear to be animated according to the changes of the style of the customized text 407 across the frames 445 in the personalized video 440.

Figure 5B:
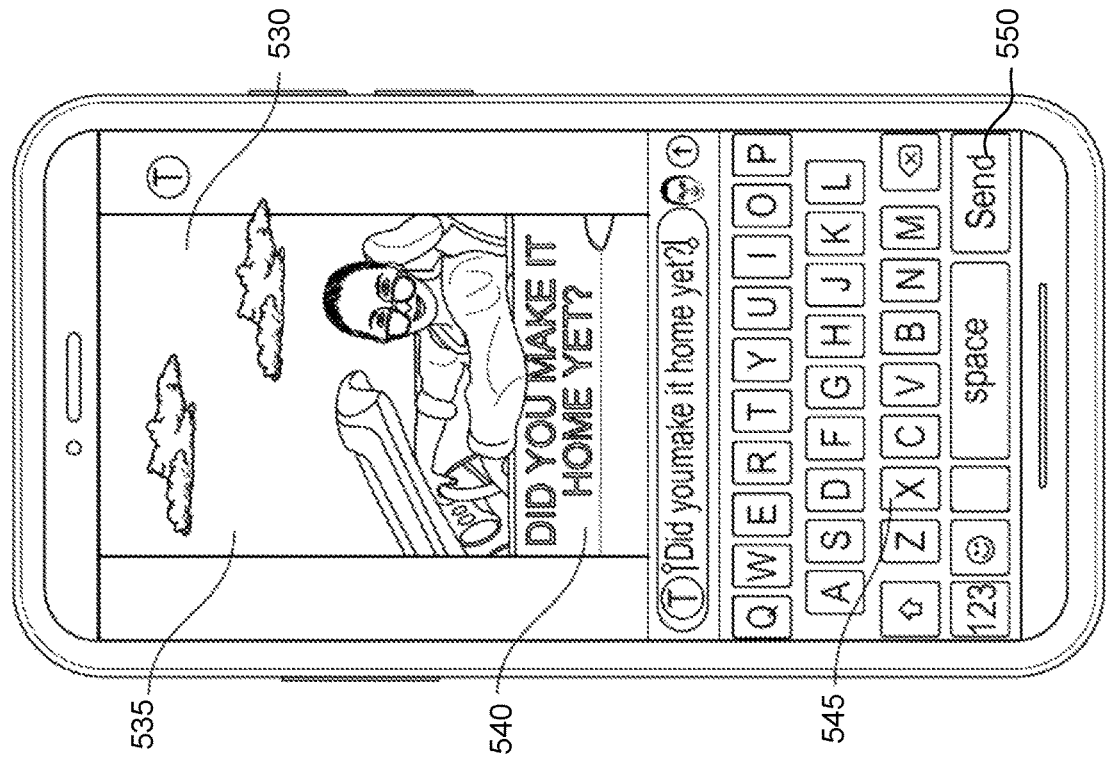
FIG. 5A and FIG. 5B show example screens of a user interface of the MMA, according to some example embodiments.
Figure 5A:
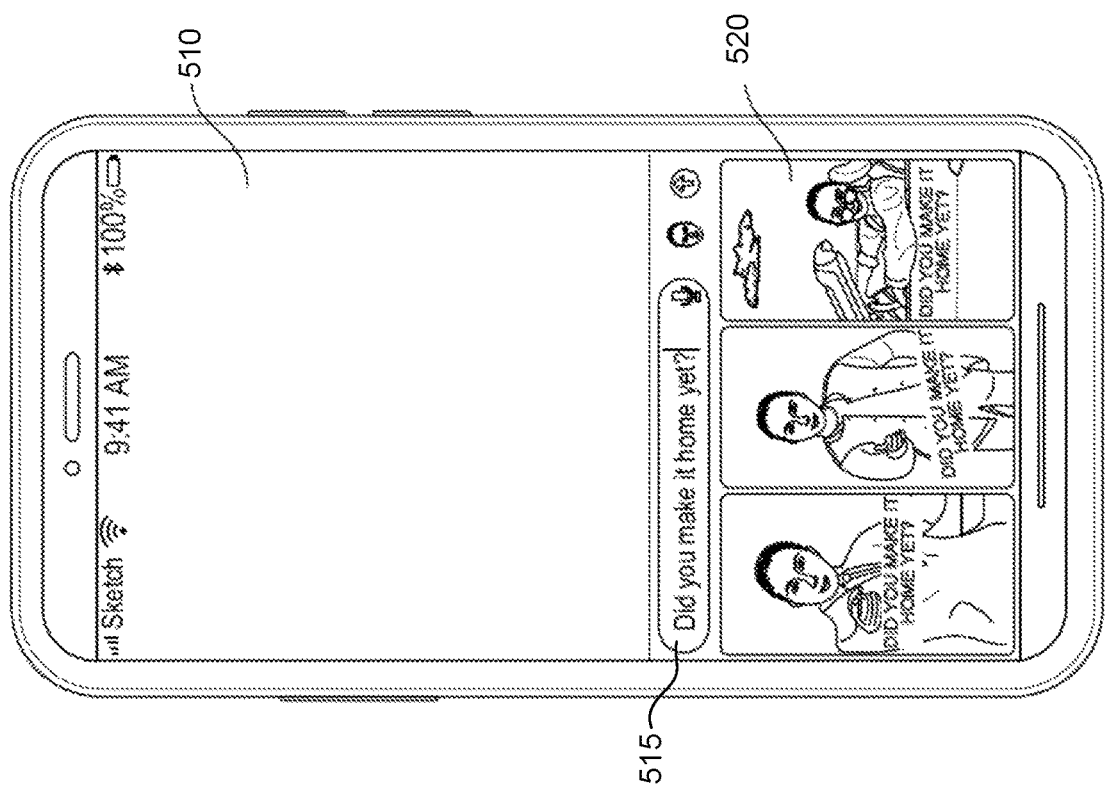

FIGS. 5A and 5B show example screens of a user interface of MMA 160, according to some example embodiments. FIG. 5A shows a user interface 510 with a search string 515 prefilled with a text message and a list 520 of reels relevant to the text message in the search string 515. The text message can be suggested by MMA 160 based on recent messages of a user in a communication chat. The user can modify the text message in the search string 515. The MMA may update the list 520 based on the modified text message.

FIG. 5B shows a user interface 530 with selected reel 535. The user can modify a text message 540 in the reel 535 using keyboard 545 either by typing the new text message or using a voice recognition option of the keyboard 545 to convert voice message to text message. The user may send the reel 540 to a communication chat via the send button 550.

Figure 6:
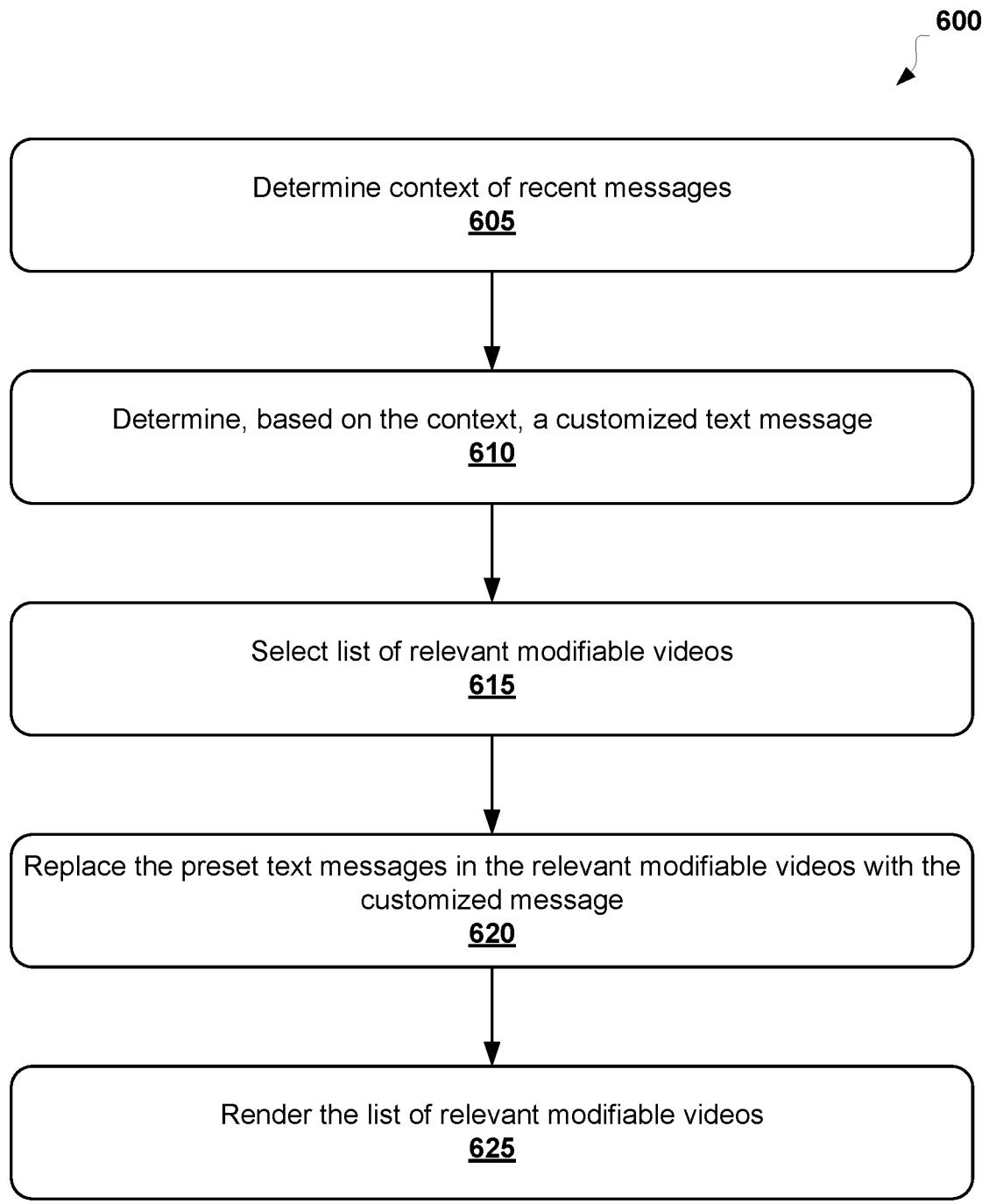
FIG. 6 is a flow chart showing a method for customizing text messages in modifiable videos of the MMAs, according to some example embodiments.

FIG. 6 is a flow chart showing a method 600 for customizing text messages in modifiable videos in MMAs, according to some example embodiments. The method 600 can be performed by PCD 105.

The method 600 may commence in block 605 with analyzing recent messages of a user in an MMA to determine a context of the recent messages. The method 600 may include determining, based on the recent messages, an emotional state of the user.

In block 610, the method 600 may include determining, based on the context, a customized text message. The customized text message can be determined by a machine learning model based on historical data from a statistical log. The statistical log may store historical data concerning information on the context and the customized text messages. The method 600 may include selecting, based on the context, a customized soundtrack from a library. The method 600 may include selecting, based on the emotional state, a style of text animation from a list of styles of text animations. The method 600 may include selecting, based on the emotional state, a hairstyle from a list of hairstyles. The method may also include modifying the selfie by applying the hairstyle to an image of the hair. In block 615, the method 600 may include selecting, based on the context, a list of relevant modifiable videos from a database. The database is configured to store modifiable videos, and the modifiable videos being associated with preset text messages, preset styles of text animation, and preset soundtracks. In some embodiments, the list of relevant modifiable videos can be determined by searching, in the database, for modifiable videos having preset text messages semantically close to the customized text message.

In block 620, the method 600 includes replacing the preset text messages in the relevant modifiable videos with the customized message. The preset style of text animation in the relevant modifiable videos can be replaced with the style of text animation selected in block 610. The preset soundtracks in the relevant modifiable videos can be replaced with the selected soundtrack.

In block 625, the method 600 includes rendering the list of relevant modifiable videos for viewing and selecting by the user. The customized text message and the modified selfie of the user are displayed in the relevant modifiable videos. The method 600 may further include providing the user with an option to enter a search string for searching the relevant modifiable videos in the database. The search string is prefilled with the customized text message. Upon receiving an indication that the user has modified the customized text message in the search string, the method 600 may include updating, based on the modified customized text message, the list of relevant modifiable videos.

Upon receiving an indication that the user has selected a modifiable video from the list of modifiable videos, the method 600 may store information concerning the context, the customized text message, the list of relevant modifiable videos, and the selected modifiable video into the statistical log.

Upon receiving an indication that the user has selected the modifiable video from the list of modifiable videos, the method 600 may include providing options to the user to modify the style of text animation and the customized soundtrack in the selected modifiable video. The method 600 may include receiving an indication that the user has modified the selected style of text animation in the selected modifiable video and, in response to the indication, storing information concerning the context and the modified selected style of text animation into the statistical log. The method 600 may adjust, based on historical data in the statistical log, an algorithm for selecting the style of text animation from the list of styles of text animations.

Figure 7:
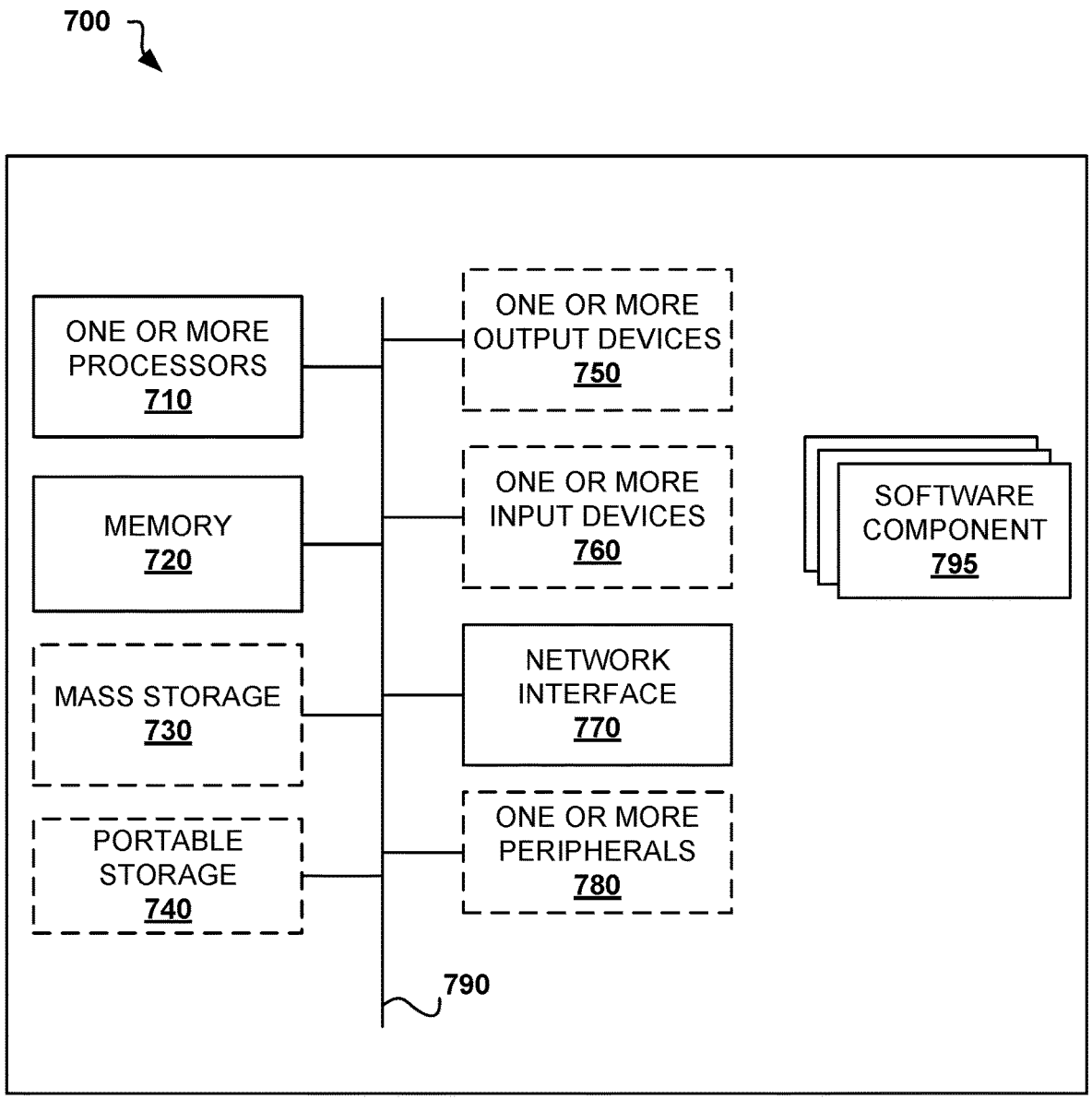
FIG. 7 shows an example computer system that can be used to implement methods for customizing soundtracks of modifiable videos of the MMAs.

FIG. 7 illustrates an example computing system 700 that can be used to implement methods described herein. The computing system 700 can be implemented in the contexts of the likes of PCDs 105 and 110, the MSS 130, the MMA 160, and the system 300 for customizing text messages in modifiable videos in MMAs.

As shown in FIG. 7, the hardware components of the computing system 700 may include one or more processors 710 and memory 720. Memory 720 stores, in part, instructions and data for execution by processor 710. Memory 720 can store the executable code when the system 700 is in operation. The system 700 may further include an optional mass storage device 730, optional portable storage medium drive(s) 740, one or more optional output devices 750, one or more optional input devices 760, an optional network interface 770, and one or more optional peripheral devices 780. The computing system 700 can also include one or more software components 795 (e.g., ones that can implement the method for providing personalized videos as described herein).

The components shown in FIG. 7 are depicted as being connected via a single bus 790. The components may be connected through one or more data transport means or data network. The processor 710 and memory 720 may be connected via a local microprocessor bus, and the mass storage device 730, peripheral device(s) 780, portable storage device 740, and network interface 770 may be connected via one or more input/output (I/O) buses.

The mass storage device 730, which may be implemented with a magnetic disk drive, solid-state disk drive, or an optical disk drive, is a non-volatile storage device for storing data and instructions for use by the processor 710. Mass storage device 730 can store the system software (e.g., software components 795) for implementing embodiments described herein.

Portable storage medium drive(s) 740 operates in conjunction with a portable non-volatile storage medium, such as a compact disk (CD) or digital video disc (DVD), to input and output data and code to and from the computing system 700. The system software (e.g., software components 795) for implementing embodiments described herein may be stored on such a portable medium and input to the computing system 700 via the portable storage medium drive(s) 740.

The optional input devices 760 provide a portion of a user interface. The input devices 760 may include an alphanumeric keypad, such as a keyboard, for inputting alphanumeric and other information, or a pointing device, such as a mouse, a trackball, a stylus, or cursor direction keys. The input devices 760 can also include a camera or scanner. Additionally, the system 700 as shown in FIG. 7 includes optional output devices 750. Suitable output devices include speakers, printers, network interfaces, and monitors.

The network interface 770 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 770 may be a network interface card, such as an Ethernet card, optical transceiver, radio frequency transceiver, or any other type of device that can send and receive information. The optional peripherals 780 may include any type of computer support device to add additional functionality to the computer system.

The components contained in the computing system 700 are intended to represent a broad category of computer components. Thus, the computing system 700 can be a server, personal computer, hand-held computing device, telephone, mobile computing device, workstation, minicomputer, mainframe computer, network node, or any other computing device. The computing system 700 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with this disclosure. Those skilled in the art are familiar with instructions, processor(s), and storage media.

It is noteworthy that any hardware platform suitable for performing the processing described herein is suitable for use with this disclosure. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, methods and systems for customizing text messages in modifiable videos in MMAs have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for customizing text messages in modifiable videos, the system comprising at least one processor and a memory storing processor-executable codes, wherein the at least one processor is configured to implement the following operations upon executing the processor-executable codes:
analyzing recent messages of a user in a multimedia messaging application to determine a context of the recent messages;
determining, based on the context, a customized text message;
selecting, based on the context, a list of relevant modifiable videos from a database configured to store modifiable videos, the modifiable videos being associated with preset text messages;
replacing the preset text messages in the relevant modifiable videos with the customized message; and
rendering the list of relevant modifiable videos for viewing and selecting by the user, the rendering including displaying the customized text message in the relevant modifiable videos.

2. The system of claim 1, further comprising:
providing the user with an option to enter a search string for searching the relevant modifiable videos in the database; and
prefilling the search string with the customized text message.

3. The system of claim 2, further comprising:
receiving an indication that the user has modified the customized text message in the search string; and
in response to the indication, updating, based on the modified customized text message, the list of relevant modifiable videos.

4. The system of claim 1, further comprising:
receiving an indication that the user has selected a modifiable video from the list of modifiable videos; and
storing information concerning the context, the customized text message, the list of relevant modifiable videos, and the selected modifiable video to a statistical log.

5. The system of claim 4, wherein the customized text message is determined by a machine learning model based on historical data from the statistical log.

6. The system of claim 1, further comprising:
determining, based on the recent messages, an emotional state of the user;
selecting, based on the emotional state, a style of text animation from a list of styles of text animations; and
replacing a preset style of text animation in the relevant modifiable videos with the selected style of text animation, wherein the relevant modifiable videos are associated with the preset style of text animation.

7. The system of claim 6, further comprising:
receiving an indication that the user has selected a modifiable video from the list of modifiable videos; and
providing the user with an option to modify the selected style of text animation in the selected modifiable video.

8. The system of claim 7, further comprising:
receiving an indication that the user has modified the selected style of text animation in the selected modifiable video;
storing information concerning the context and the modified selected style of text animation to a statistical log; and
adjusting, based on historical data in the statistical log, an algorithm for selecting the style of text animation from the list of styles of text animations.

9. The system of claim 1, further comprising:
selecting, based on the customized message, a soundtrack from a library of soundtracks; and
replacing preset soundtracks in the relevant modifiable videos with the selected soundtrack, wherein the relevant modifiable videos are associated with the preset soundtracks.

10. The system of claim 1, further comprising:
determining, based on the recent messages, an emotional state of the user;
selecting, based on the emotional state, a hairstyle from a list of hairstyles; and
applying the hairstyle to an image of hair in a selfie of the user to modify the selfie of the user, and wherein the rendering including displaying the modified selfie of the user in the relevant modifiable videos.

11. A method for customizing text messages in modifiable videos, the method comprising:
analyzing recent messages of a user in a multimedia messaging application to determine a context of the recent messages;

determining, based on the context, a customized text message;
selecting, based on the context, a list of relevant modifiable videos from a database configured to store modifiable videos, the modifiable videos being associated with preset text messages;
replacing the preset text messages in the relevant modifiable videos with the customized message; and
rendering the list of relevant modifiable videos for viewing and selecting by the user, the rendering including displaying the customized text message in the relevant modifiable videos.

12. The method of claim 11, further comprising:
providing the user with an option to enter a search string for searching the relevant modifiable videos in the database; and
prefilling the search string with the customized text message.

13. The method of claim 12, further comprising:
receiving an indication that the user has modified the customized text message in the search string; and
in response to the indication, updating, based on the modified customized text message, the list of relevant modifiable videos.

14. The method of claim 11, further comprising:
receiving an indication that the user has selected a modifiable video from the list of modifiable videos; and
storing information concerning the context, the customized text message, the list of relevant modifiable videos, and the selected modifiable video to a statistical log.

15. The method of claim 14, wherein the customized text message is determined by a machine learning model based on historical data of the statistical log.

16. The method of claim 11, further comprising:
determining, based on the recent messages, an emotional state of the user;
selecting, based on the emotional state, a style of text animation from a list of styles of text animations; and
replacing a preset style of text animation in the relevant modifiable videos with the selected style of text animation, wherein the relevant modifiable videos are associated with the preset style of text animation.

17. The method of claim 16, further comprising:
receiving an indication that the user has selected a modifiable video from the list of modifiable videos; and
providing the user with an option to modify the selected style of text animation in the selected modifiable video.

18. The method of claim 17, further comprising:
receiving an indication that the user has modified the selected style of text animation in the selected modifiable video;
storing information concerning the context and the modified selected style of text animation into a statistical log; and
adjusting, based on historical data in the statistical log, an algorithm for selecting the style of text animation from the list of styles of text animations.

19. The method of claim 11, further comprising:
selecting, based on the customized message, a soundtrack from a library of soundtracks;
replacing preset soundtracks in the relevant modifiable videos with the selected soundtrack, wherein the relevant modifiable videos are associated with the preset soundtracks;
determining, based on the recent messages, an emotional state of the user;
selecting, based on the emotional state, a hairstyle from a list of hairstyles; and
applying the hairstyle to an image of hair in a selfie of the user to modify the selfie of the user, and wherein the rendering including displaying the modified selfie of the user in the relevant modifiable videos.

20. A non-transitory processor-readable medium having instructions stored thereon, which when executed by one or more processors, cause the one or more processors to implement a method for customizing text messages in modifiable videos, the method comprising:
analyzing recent messages of a user in a multimedia messaging application to determine a context of the recent messages;
determining, based on the context, a customized text message;
selecting, based on the context, a list of relevant modifiable videos from a database configured to store modifiable videos, the modifiable videos being associated with preset text messages;
replacing the preset text messages in the relevant modifiable videos with the customized message; and
rendering the list of relevant modifiable videos for viewing and selecting by the user, the rendering including displaying the customized text message in the relevant modifiable videos.

* * * * *